United States Patent [19]
Yokoi et al.

[11] Patent Number: 5,760,946
[45] Date of Patent: Jun. 2, 1998

[54] OPTICAL ISOLATOR, FARADAY ROTATOR SUITABLE FOR USE IN THE SAME, AND LASER DIODE MODULE INCORPORATING THE SAME

[75] Inventors: Saeko Yokoi; Takayuki Masuko; Shunichi Satoh; Tetsuo Ishizaka; Manabu Komiyama, all of Kawasaki, Japan

[73] Assignee: Fujitsu Limited, Kanagawa, Japan

[21] Appl. No.: 835,790

[22] Filed: Apr. 15, 1997

Related U.S. Application Data

[63] Continuation of Ser. No. 522,544, Sep. 1, 1995, abandoned, which is a continuation of Ser. No. 281,483, Jul. 27, 1994, abandoned.

[30] Foreign Application Priority Data

Jan. 21, 1994 [JP] Japan .................. 6-004918

[51] Int. Cl.⁶ .................. G02F 1/09; G02B 5/30
[52] U.S. Cl. .................. 359/281; 359/283; 359/484; 372/703
[58] Field of Search .................. 359/280, 281, 359/282, 283, 484, 496, 497, 498; 372/703

[56] References Cited

U.S. PATENT DOCUMENTS

| | | | |
|---|---|---|---|
| 2,973,684 | 3/1961 | Nisle | 359/281 |
| 3,370,916 | 2/1968 | Shafer | 359/281 |
| 4,609,257 | 9/1986 | Shirasaki | 359/281 |
| 4,770,505 | 9/1988 | Okazaki | 359/283 |
| 4,812,767 | 3/1989 | Taketomi | 359/281 |
| 4,926,430 | 5/1990 | Isono | 372/33 |
| 5,040,863 | 8/1991 | Kawakami et al. | 359/484 |
| 5,111,330 | 5/1992 | VanDelden et al. | 359/281 |
| 5,128,956 | 7/1992 | Aoki et al. | 372/703 |
| 5,345,329 | 9/1994 | Shirai et al. | 359/484 |

FOREIGN PATENT DOCUMENTS

| | | | |
|---|---|---|---|
| 0279412 | 8/1988 | European Pat. Off. | 359/484 |
| 413113 | 2/1990 | Japan . | |
| 0201416 | 8/1990 | Japan | 359/280 |
| 0137616 | 6/1991 | Japan | 359/280 |
| 3248117 | 11/1991 | Japan . | |
| 4-115221 | 4/1992 | Japan | 359/280 |
| 5-45609 | 2/1993 | Japan | 372/703 |
| WO89/12212 | 12/1989 | WIPO . | |

OTHER PUBLICATIONS

A. Shibukawa, et al., "Compact Optical Isolator for Near-Infrared Radiation", Electronics Letters, vol. 13, No. 24, Nov. 24, 1977, pp. 721–722.

*Primary Examiner*—Ricky D. Shafer
*Attorney, Agent, or Firm*—Helfgott & Karas, PC

[57] ABSTRACT

An optical isolator has a low-profile construction. Two rod-like permanent magnets are on two sides of a Faraday element in parallel to an optical axis. The two permanent magnets are sandwiched and fixed between two ferromagnetic frames each having a light path hole therein. The ferromagnetic frames are each provided with a protrusion for guiding the magnetic flux generated by the permanent magnets to the Faraday element.

10 Claims, 3 Drawing Sheets

OPTICAL ISOLATOR, FARADAY ROTATOR SUITABLE FOR USE IN THE SAME, AND LASER DIODE MODULE INCORPORATING THE SAME

This is a continuation, of application Ser. No. 08/522, 544, filed Sep. 1, 1995, now abandoned, which is a continuation of Ser. No. 08/281,483, filed Jul. 27, 1994, now abandoned.

BACKGROUND OF THE INVENTION

1. Field of the Invention

The present invention relates to an optical isolator, a Faraday rotator suitable for use in the same, and a laser diode module incorporating the same.

2. Description of the Related Art

An optical isolator may be used in combination with a semiconductor laser diode (LD), to prevent back-reflections, caused at optical fiber connections, from affecting the stable operation of the LD when transmitting light, emitted from the LD, through an optical fiber. In many cases, the optical isolator for such use is assembled in an LD package containing an LD.

In this type of optical isolator, a Faraday element is positioned in the center of a hollow cylindrical permanent magnet so a magnetic field in the direction of the optical axis is applied to the Faraday element placed on the optical axis. In other words, the Faraday element placed on the optical axis is surrounded by a cylindrical permanent magnet.

When an optical isolator is assembled in an LD package for use, the optical isolator is mounted onto a frame of the LD package by welding or other means. In this case, it is desirable that the optical isolator be made as thin as possible to enable the size of the whole unit to be reduced. However, with prior known optical isolators, it has been difficult to reduce the thickness and achieve a low-profile construction because, as described above, a permanent magnet in the shape of a hollow cylinder is used to enclose the Faraday element.

SUMMARY OF THE INVENTION

The present invention is intended to resolve the problem of the prior art, and an object of the invention is to provide an optical isolator capable of realizing a low-profile construction by improving the shape of the permanent magnet used in the optical isolator, and also provide a Faraday rotator suitable for use in such an optical isolator, and a laser diode module incorporating such an optical isolator.

According to the present invention, there is provided an optical isolator comprising: a polarizer; a Faraday element disposed on an optical axis of the polarizer; a solid permanent magnet disposed in close proximity to the Faraday element; and a ferromagnetic member for guiding a substantial proportion of the magnetic flux generated by the permanent magnet to the Faraday element.

According to the present invention, there is also provide a Faraday rotator comprising: a Faraday element; a solid permanent magnet disposed in close proximity to the Faraday element; and a ferromagnetic member for guiding a substantial proportion of the magnetic flux generated by the permanent magnet to the Faraday element.

According to the present invention, there is also provided a laser diode module comprising: a polarizer; a Faraday element disposed on an optical axis of the polarizer; a solid permanent magnet disposed in close proximity to said Faraday element; a ferromagnetic member for guiding a substantial proportion of the magnetic flux generated by the permanent magnet to the Faraday element; and a laser diode disposed near said Faraday element and on the optical axis.

DESCRIPTION OF THE PREFERRED EMBODIMENTS

Figure 1:
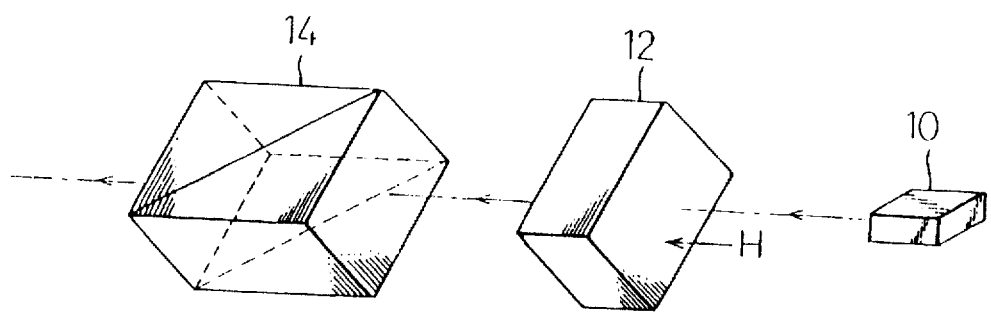
FIG. 1 is a simplified schematic diagram showing optics in an optical isolator.

FIG. 1 is a simplified schematic diagram showing optics in an optical isolator used in combination with a laser diode. In FIG. 1, a Faraday rotator 12, which rotates the plane of polarization by 45°, and a polarizing prism 14, which is oriented at 45°, are arranged on the optical axis of the incident light from a laser diode 10. As is well known, the Faraday rotator 12 contains a Faraday element formed from an optically isotropic transparent medium to which a magnetic field H is applied in the direction of the optical axis.

When a beam of light from the laser diode (LD) 10 is input in the forward direction to the optical isolator, that is, from the side nearer to the Faraday rotator 12, a linear-polarization component in the input beam having a prescribed plane of polarization is rotated 45° by the Faraday rotator 12, and the light whose plane of rotation is thus rotated enters the polarizing prism 14. Since the polarizing prism 14 is oriented 45° with respect to the plane of polarization of the output light of the LD 10, the light from the Faraday rotator 12 is passed through the polarizing prism 14, thus producing the output beam.

On the other hand, when an input beam is fed in the opposite direction, that is, from the side nearer to the polarizing prism 14, only a beam of polarized light whose plane of polarization coincides with the orientation of the polarizing prism 14 is allowed to pass through the polarizing prism 14, then through the Faraday rotator 12, from which the beam emerges with its plane of polarization rotated 45°. In this case, the plane of polarization of the light is rotated in the same direction as the direction in which the light input in the forward direction is rotated; as a result, the plane of polarization of the light fed in the opposite direction is orthogonal to that of the input light fed in the forward direction.

Therefore, when an optical isolator comprising a Faraday rotator and a polarization prism, such as shown in FIG. 1, is inserted in the output light path of an LD, back-reflections from optical fiber connections, etc. do not affect the LD, and thus, unstable operation of the LD due to back-reflections can be prevented.

Figure 2A:
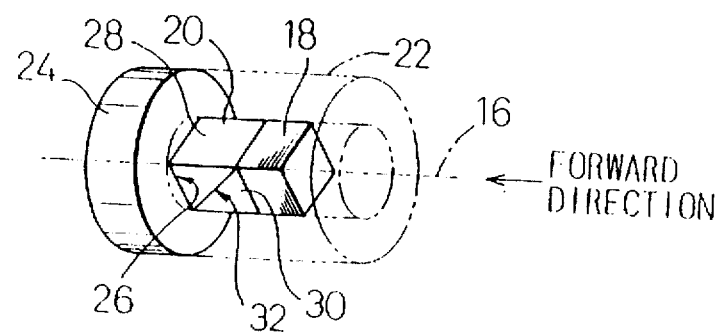
FIGS. 2A and 2B are a perspective view and a cross-sectional view, respectively, of a prior art optical isolator.
Figure 2B:
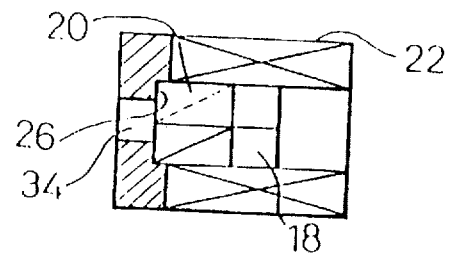

FIGS. 2A and 2B show an optical isolator of the prior art. FIG. 2A is a perspective view, and FIG. 2B is a cross-sectional view.

As shown in FIGS. 2A and 2B, the optical isolator comprises a Faraday element 18 and a polarizing prism 20 arranged on an optical axis 16 and housed in a hollow cylindrical permanent magnet 22, the entire construction being mounted in a frame 24 made of stainless steel or the like.

The polarizing prism 20 is inserted in a recess 26 formed in the frame 24 and secured thereto by adhesion or other means. Further, the permanent magnet 22 is secured to the circumference of the disc-shaped frame 24 by adhesion or other means. The whole unit is thus fabricated as an integral construction.

The Faraday element 18 is placed in a magnetic field produced by the permanent magnet 22; when a collimated beam of linearly polarized light is fed into it, the Faraday element 18 rotates the plane of polarization of the input beam by 45°. The permanent magnet 22 is magnetized in the same direction as the direction of the light path, and is formed in the shape of a hollow cylinder; with the Faraday element 18 positioned in its center, the magnetic field is applied to the Faraday element 18 in the direction of the optical axis 16.

The polarizing prism 20 is a right quadrangular prism consisting of two right triangular prisms, 28 and 30, bonded back-to-back, with a polarization splitting film, formed from multiple dielectric layers, sandwiched therebetween to form a reflecting face 32. The polarizing prism 20 transmits light having a prescribed plane of polarization, and reflects and blocks light having a plane of polarization orthogonal to it.

When an input beam from an LD (not shown) is fed in the forward direction into the optical isolator, that is, when a collimated beam of linearly polarized light having a prescribed plane of polarization is input from the side nearer to the Faraday element 18 toward the polarizing prism 20, the plane of polarization of the light is rotated 45° by a Faraday rotator formed from the Faraday element 18 and permanent magnet 22, and the thus rotated light enters the polarizing prism 20. Since the polarizing prism 20 is oriented 45° with respect to the plane of polarization of the input beam, the light from the Faraday rotator is allowed to pass through, and output light emerges from a light path hole 34 formed in the frame 26.

On the other hand, when an input beam is fed in the opposite direction to the optical isolator, that is, when light is input from the opposite side of the polarizing prism 20, only a beam of polarized light whose plane of polarization coincides with the orientation of the polarizing prism 20 is allowed to pass through it. The light passing through the polarizing prism 20 enters the Faraday element 18 which rotates the plane of polarization 45°. In this case, the light is rotated in the same direction as the direction in which the light input in the forward direction is rotated. As a result, the light input in the opposite direction emerges from the optical isolator with its plane of polarization rotated 90°, i.e., orthogonal to that of the input light in the forward direction.

When back-reflections are fed back to the LD operating at high speed, the operation of the LD may become unstable, leading to degradation of the light signal it produces. However, when the optical isolator shown in FIGS. 2A and 2B is inserted in the output light path of the LD, back-reflections do not affect the LD, and thus, unstable operation of the LD due to back-reflections can be prevented. However, in the prior art optical isolator shown in FIGS. 2A and 2B, since the Faraday element 18 positioned on the optical axis is enclosed in a hollow cylindrical permanent magnet, it has not been possible to reduce the thickness of the whole construction.

Figure 3A:
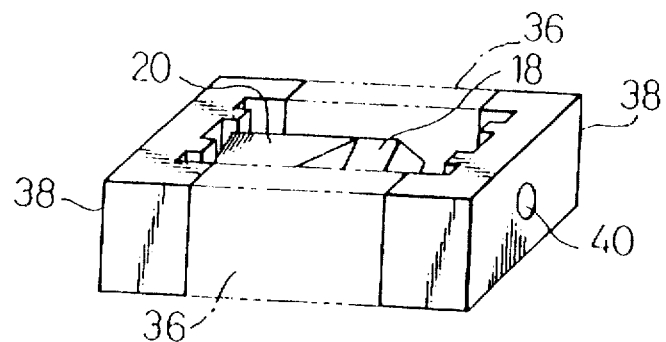
FIGS. 3A and 3B are a perspective view and a cross-sectional view, respectively, of an optical isolator according to one embodiment of the invention.
Figure 3B:
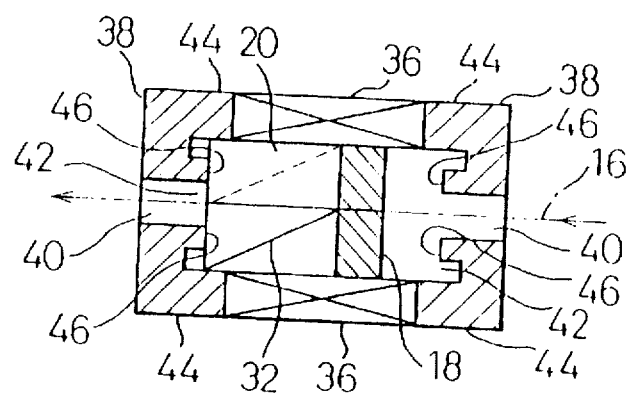
Figure 3C:
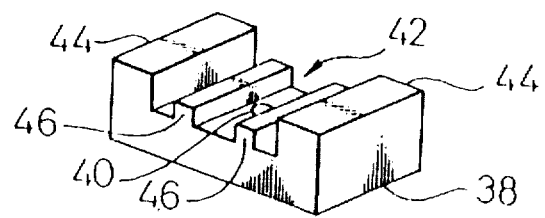
FIG. 3C is a perspective view showing a frame for the optical isolator according to the one embodiment.

FIGS. 3A to 3C show a construction according to one embodiment of the invention: FIG. 3A is an external perspective view, FIG. 3B is a cross-sectional view, and FIG. 3C is a perspective view of a frame. The same parts as those shown in FIGS. 2A and 2B are designated by the same reference numerals, wherein 36 is a rod-like permanent magnet, 38 is a frame formed of a magnetic substance, such as soft iron, having high magnetic permeability, and preferably a weldable material, 40 is a light path hole formed in the frame 38, 42 is a recess formed in the frame 38, 44 are end portions, provided on both sides of the recess 42, for securing the permanent magnet, and 46 are protrusions formed in the recess 42. The Faraday element 18 and the polarizing prism 20 are the same as those shown in FIGS. 2A and 2B.

As shown in FIGS. 3A and 3B, the permanent magnets 36 are respectively held between the end portions 44 at both ends of the two frames 38 and secured in place by adhesion or other means, while the polarizing prism 20 is inserted in the recess 42 in one frame and secured to it by adhesion or other means. The protrusions 46, which are, for example, of the same height, serve to guide the magnetic flux, emerging from the permanent magnets 36, toward the Faraday element 18 and also to hold the end of the polarizing prism 20 perpendicular to the optical axis 16. Further, the Faraday element 18 is secured to the polarizing prism 20. In this arrangement, the light path holes 40 formed in the frames at both ends, the Faraday element 18, and the polarizing prism 20 are disposed with their centers aligned with the same optical axis 16.

When mounting this optical isolator in an LD package, etc., the optical isolator is secured parallel to the package surface by welding the frames to the package or by other means.

In the optical isolator shown in FIGS. 3A to 3C, the magnetic flux lines emerging from the two rod-like permanent magnets 36 pass through one frame, then through the Faraday element 18 and polarizing prism 20, and return to the respective magnets through the other frame, thereby applying the required magnetic field to the Faraday element 18.

Figure 4:
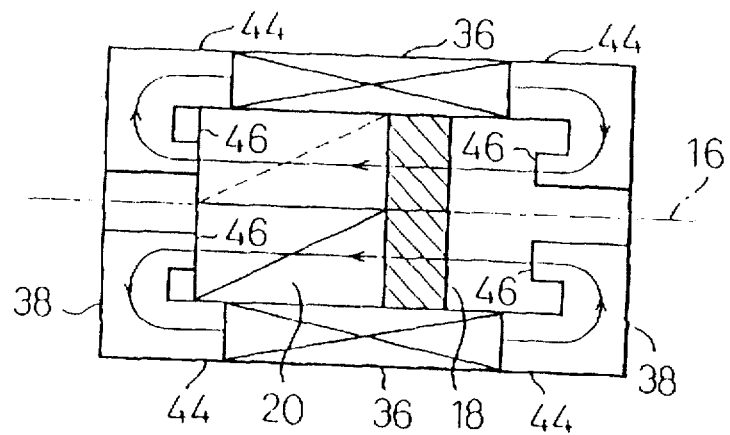
FIG. 4 is a diagram showing the magnetic flux produced in the optical isolator shown in FIGS. 3A to 3C.

FIG. 4 illustrates the magnetic flux produced in the optical isolator of the present invention. The same parts as those shown in FIGS. 3A to 3C are designated by the same reference numerals. In FIG. 4, the principal paths of the magnetic flux lines produced by the two permanent magnets 36 are illustrated in schematic form. Since the two permanent magnets 36 have the same direction of magnetization, the magnetic flux lines emerging from one end of each permanent magnet pass through the end portion 44 and protrusion 46 of the ferromagnetic frame at one end, then through the Faraday element 18 and polarizing prism 20 in the same direction, and return to the other end of the permanent magnet through the protrusion 46 and end portion 44 of the frame at the other end. At this time, the protrusions 46 serve to concentrate the magnetic flux on the Faraday element 18.

In the optical isolator of the invention, rod-like permanent magnets are placed on both sides of the Faraday element. This arrangement allows a reduction in permanent magnet size, and hence the size of the optical isolator, permitting a low-profile construction.

The optical isolator of the invention is provided with frames 38 made of a ferromagnetic substance. These frames help to concentrate the magnetic flux produced by the permanent magnets 36 on the Faraday element 18, ensuring stable and reliable polarization rotating operation in the Faraday rotator. This also permits a reduction in permanent magnet size, and hence the size of the optical isolator construction, for easy mounting.

In the optical isolator of the invention, since one or more protrusions 46 are formed in the recess 42 of each frame 38, the magnetic flux produced by the permanent magnets 36 can be concentrated more effectively on the Faraday element 18, which also permits a reduction in permanent magnet size.

In the embodiment shown in FIGS. 3A to 3C, two permanent magnets for applying a magnetic field to the Faraday rotator are arranged symmetrically to each other to provide uniform magnetic flux density throughout the Faraday element, but the invention is not limited to this arrangement. For example, three or more permanent magnets may be arranged so as to provide a uniform magnetic field.

Further, the invention does not necessarily require the provision of two or more permanent magnets, but a single permanent magnet may be used if it can apply a sufficient magnetic field to the Faraday rotator.

Figure 5A:
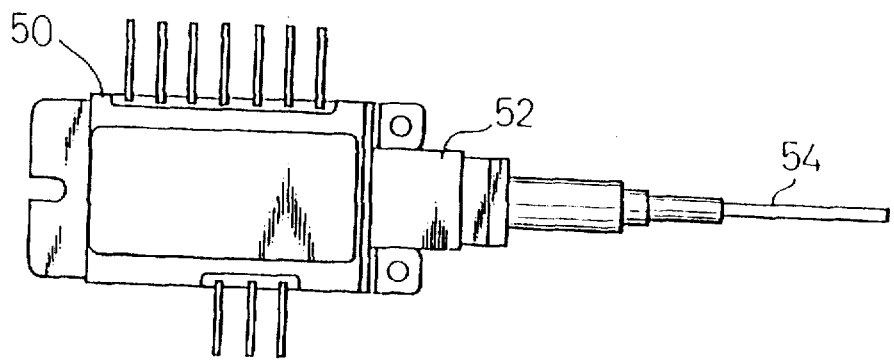
FIGS. 5A and 5B are a top plan view and a side view, respectively, of a laser diode module incorporating the optical isolator of the invention.
Figure 5B:
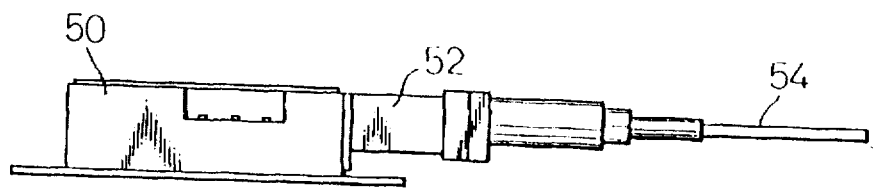

FIGS. 5A and 5B illustrate an example of an LD module incorporating the optical isolator of the present invention. FIG. 5A is a top plan view, and FIG. 5B is a side view. The numeral 50 is an LD package in which an LD as a light source and its driving circuitry are contained. The numeral 52 is an isolator section in which the optical isolator of the present invention is contained and through which, of the light emitted from the LD package, polarized light having a particular plane of polarization is passed for output. The numeral 54 is an optical fiber for transmitting the output light from the isolator section 52.

We claim:

1. An optical isolator comprising:
   a polarizer;
   a Faraday element disposed on an optical axis of said polarizer;
   a first permanent magnet disposed on one side of said axis such that said first permanent magnet does not surround said Faraday element and in close proximity to said Faraday element, and
   a first ferromagnetic member for guiding a substantial proportion of the magnetic flux generated by said first permanent magnet to said Faraday element,
   wherein said first ferromagnetic member is further provided with a recess for holding said polarizer, and a light path hole through which the optical axis of said polarizer passes.

2. An optical isolator comprising:
   a polarizer;
   a Faraday element disposed on an optical axis of said polarizer;
   a first permanent magnet disposed on one side of said axis such that said first permanent magnet does not surround said Faraday element and in close proximity to said Faraday element; and
   a first ferromagnetic member for guiding a substantial proportion of the magnetic flux generated by said first permanent magnet to said Faraday element,
   wherein said isolator includes a second permanent magnet that does not surround said Faraday element, said first and second permanent magnets having the same magnetization direction and arranged on both sides of said Faraday element in parallel to the optical axis, and said first ferromagnetic member includes a first ferromagnetic frame for guiding magnetic flux from said first and second permanent magnets to said Faraday element, and a second ferromagnetic frame for guiding the magnetic flux from said Faraday element to said first and second permanent magnets.

3. An optical isolator according to claim 2, wherein said first and second ferromagnetic frames are each provided with two first protrusions whose respective ends are in contact with respective magnetic poles of said first and second permanent magnets, and a second protrusion protruding toward said Faraday element.

4. An optical isolator according to claim 2, wherein one of said first and second ferromagnetic frames is further provided with a recess for holding said polarizer, and said first and second ferromagnetic frames are each further provided with a light path hole through which the optical axis of said polarizer passes.

5. A Faraday rotator comprising:
   a Faraday element having an axis;
   a first permanent magnet disposed in close proximity to said Faraday element on one side of said axis, such that said first Permanent magnet does not surround said Faraday element;
   a first ferromagnetic member for guiding a substantial proportion of the magnetic flux generated by said first permanent magnet to said Faraday element; and
   a second permanent magnet that does not surround said Faraday element, said first and second permanent magnets having the same magnetization direction and arranged on two sides of said Faraday element in parallel to the optical axis,
   and said first ferromagnetic member includes a first ferromagnetic frame for guiding magnetic flux from said first and second permanent magnets to said Faraday element, and further comprising
   a second ferromagnetic frame for guiding the magnetic flux from said Faraday element to said first and second magnets.

6. A Faraday rotator according to claim 5, wherein said first and second ferromagnetic frames are each provided with two first protrusions whose respective ends are in contact with respective magnetic poles of said first and second permanent magnets, and a second protrusion protruding toward said Faraday element.

7. A laser diode module comprising:
   a polarizer;
   a Faraday element disposed on an optical axis of said polarizer;
   a first permanent magnet disposed in close proximity to said Faraday element on one side of said axis such that said first permanent magnet does not surround said Faraday element;
   a first ferromagnetic member for guiding a substantial proportion of the magnetic flux generated by said first permanent magnet to said Faraday element; and
   a laser diode disposed near said Faraday element on the optical axis,
   wherein said first ferromagnetic member is further provided with a recess for holding said polarizer, and a light path hole through which the optical axis of said polarizer passes.

8. A laser diode module comprising:
   a polarizer;
   a Faraday element disposed on an optical axis of said polarizer;

a first permanent magnet disposed in close proximity to said Faraday element on one side of said axis such that said first permanent magnet does not surround said Faraday element;

a first ferromagnetic member for guiding a substantial proportion of the magnetic flux generated by said first permanent magnet to said Faraday element;

a laser diode disposed near said Faraday element on the optical axis, a second permanent magnet that does not surround said Faraday element, said first and second permanent magnets having the same magnetization direction and arranged on two sides of said Faraday element in parallel with the optical axis, and said first ferromagnetic member includes a first ferromagnetic frame for guiding magnetic flux from said first and second permanent magnets to said Faraday element, and further comprising second ferromagnetic frame for guiding the magnetic flux from said Faraday element to said first and second permanent magnets.

9. A laser diode module according to claim 8, wherein said first and second ferromagnetic frames are each provided with two first protrusions whose respective ends are in contact with respective magnetic poles of said first and second permanent magnets, and a second protrusion protruding toward said Faraday element.

10. A laser diode module according to claim 8, wherein one of said first and second ferromagnetic frames, is further provided with a recess for holding said polarizer, and said first and second ferromagnetic frames are each further provided with a light path hole through which the optical axis of said polarizer passes.

* * * * *